United States Patent [19]

Kittel et al.

[11] 4,215,311

[45] Jul. 29, 1980

[54] ADAPTIVE DELTA-MODULATION SYSTEM

[75] Inventors: Ludwig Kittel, Heroldsberg; Dieter Schwarz, Nuremberg, both of Fed. Rep. of Germany

[73] Assignee: Te Ka de Felten & Guilleaume Fernmeldeanlagen GmbH, Nuremberg, Fed. Rep. of Germany

[21] Appl. No.: 858,819

[22] Filed: Dec. 8, 1977

[30] Foreign Application Priority Data

Dec. 16, 1976 [DE] Fed. Rep. of Germany ....... 2656975

[51] Int. Cl.$^2$ ............................................ H03K 13/22
[52] U.S. Cl. ..................................... 375/5; 332/11 D; 375/30
[58] Field of Search .............. 358/133, 135; 325/38 B; 332/11 D; 340/347 AD

[56] References Cited

U.S. PATENT DOCUMENTS

| | | | |
|---|---|---|---|
| 3,414,818 | 12/1968 | Reidel | 325/38 B |
| 3,555,423 | 1/1971 | Weston | 325/38 B |
| 3,806,806 | 4/1974 | Brolin | 325/38 B |
| 3,896,399 | 7/1975 | McDonald | 325/38 B |
| 3,927,372 | 12/1975 | Zschunke | 325/38 B |
| 4,123,709 | 10/1978 | Dodds | 325/38 B |

*Primary Examiner*—Benedict V. Safourek
*Attorney, Agent, or Firm*—Michael J. Striker

[57] ABSTRACT

A data waveform modulates a carrier to produce a data-waveform-modulated input signal v, which is applied to the input of a delta-modulation transmitter of controllable quantization-step size. The delta-modulated output signal d of the transmitter is fed through a shift register, to the individual stages of which the inputs of a coincidence gate are connected. The output signal of the coincidence gate is transmitted through a narrowband filter tuned to a frequency $f_s$ equal to the symbol transmission rate of the data-waveform-modulated input signal v. The narrowband-filter output signal is utilized to control quantization step size.

9 Claims, 6 Drawing Figures

ADAPTIVE DELTA-MODULATION SYSTEM

BACKGROUND OF THE INVENTION

The invention relates of the transmission of a data-waveform-modulated signal utilizing an adaptive-delta-modulation transmission system.

When delta-modulating an analog message signal, for example a speech signal, the message signal is sampled at uniformly spaced instants in time, each sampled value is compared against the value of the delta-modulation approximation signal, and depending upon which of the two values being compared is the greater the modulator of the system assumes one or the other of its two states. The output pulse train of the modulator is then what is transmitted. The sampling frequency is so selected that, between two sampling instants, the amplitude of the analog message signal will not change by more than the amount of the quantization step. When the analog message signal is predictably of low amplitude, the magnitude of the quantization step should be made small, to keep low the quantization noise which is introduced during the process of message-signal reconstruction at the receiver. If the amplitude and frequency of the message signal is high, then the quantization step size should be great, to keep low the distortion which can result from slope-overload. Such distortion arises when the slope of the analog message signal exceeds the maximum effective slope which the approximation signal can achieve, i.e., exceeds the product of the quantization step size and the sampling frequency. Both forms of distortion, i.e., both quantization noise and slope-overloading, can be kept low if the size of the delta-modulation step is made variable. This can be done by automatically varying the step size in proportion to the slope of the analog message signal, the information concerning the slope of the message signal being derived not from the message signal itself but instead from the delta-modulated signal produced at the modulator output. Delta-modulation techniques utilizing varying step size are generally referred to as adaptive delta modulation.

When one utilizes adaptive delta modulation for the transmission of speech signals, it is customary to assume that, for the duration of a single spoken syllable, the amplitude of the envelope of the speech signal will stay approximately constant. Accordingly, within time intervals corresponding to the duration of a single spoken syllable, the amount by which step size is varied is conventionally to be kept small. For example, this viewpoint underlies the delta-modulation transmission system disclosed in German published patent application DT-OS No. 19 11 431. In that system, to ascertain the slope of the analog message signal, the step-size control circuit of the system examines, on an ongoing basis, three or more successive ones of the constituent binary pulses of the delta-modulated output waveform, to determine the extent to which these pulses are all of the same polarity. This sequence of determinations is averaged in an ongoing manner to generate a control signal used to automatically vary the step size.

In communications systems employing adaptive delta modulation, it may be necessary to transmit a message signal other than speech, for example a rectangular binary data waveform. When transmitting such data via telephone lines, for example, it is customary to utilize a modem technique. The rectangular binary data waveform to be transmitted is converted, using one form of modulation or another, into a data-waveform-modulated signal suitable for transmission along the transmission channel to be used. At the receiver end of the transmission channel, a corresponding form of demodulation is utilized, to recover the binary data waveform. Various modulation-demodulation techniques are customarily employed. For example, when bits are to be transmitted at a rate less than or equal to 1200 bits per second, it is customary to employ frequency-modulation. CCITT recommendation V23 makes a proposal for standardization in this connection, according to which the two characteristic frequencies 1300 Hz and 2100Hz are to constitute the symbols for the information to be transmitted. In contrast, when the data waveform to be transmitted has a bit stream frequency in excess of 1200 bits per second, it is now customary to utilize differential phase-shift keying (DPSK) for the modem. CCITT recommendations V 26, V 26 bis, V 27, V27 bis and V 27 ter provide proposals for standardization, here too. In differential phase-shift keying, most generally, the phase of a carrier signal is changed or reestablished (rekeyed) with a frequency $f_s$ corresponding to the frequency of the modulating symbol stream (e.g., with a frequency corresponding to the number of bits per second if the modulating symbol stream is a bit stream). The difference in the phase of the modulated carrier as between two successive rekeying instants represents the symbol to be transmitted. In an m-ary system, the number of different symbols which are to be transmitted (m=2 in a binary system) takes into account of course the utilizable bandwidth of the speech channel to be used and the transmission speed or bit stream frequency $f_b$ of the binary rectangular data waveform. In general, $m=2^n$, wherein n is the number of constituent bits of a bit combination of the rectangular data waveform. Each possible binary state of such bit combination has associated with it a certain phase-difference value. The bit stream frequency $f_b$ is accordingly given by the equation $f_b = n \cdot f_s$.

CCITT recommendation V 26 proposes a particular modem for a bit stream frequency of 2400 bits per second, utilizing four symbols (phase-difference values). The rectangular data waveform is formed into bit combinations of n=2, often called dibits. The symbol stream frequency (in this case often called the dibit frequency) accordingly amounts to 1200 Hz. If one is concerned with a bit frequency of 4800 bits per second and utilizes the modem proposed in CCITT recommendation V 27, the symbol frequency is 1600 symbols per second (n =3).

Another modulation technique used for modems is phase reference modulation. Here, the symbols to be transmitted are not represented by the difference in phase of the carrier at two successive rekeying instants, but instead by the phase of the carrier relative to the constant phase of a reference carrier.

These various modem techniques and others are used when using a rectangular data waveform (or more generally a data waveform which may or may not consist of rectangular pulses) to form a data-waveform-modulated signal which is to be transmitted by means of adaptive delta modulation. It is often necessary to be able to quantitatively characterize the transmission accuracy of such a modem plus adaptive-delta-modulation system. This is often done as follows. There is applied to the input of the delta modulation system not only the data-waveform-modulated signal to be delta-modulated transmitted but also a predetermined noise signal whose transmission level differs by a preselected amount from the transmission level of the data-waveform-modulated signal. One then compares the bits of the recovered rectangular data waveform at the receiver end against the bits of the original rectangular data waveform, to determine the bit error quotient. The transmission level of the data-waveform-modulated signal applied to the input of the delta modulator is then varied, in order to determine the functional dependence of the bit error quotient upon the transmission level of the data-waveform-modulated signal.

The difference between the transmission level of the data-waveform-modulated signal and the transmission level of the input noise signal is maintained constant, as the transmission level of the data-waveform-modulated input signal is varied. It proves to be the case that the bit error quotient is not constant. However, even more troublesome, the bit error quotient assumes a minimum value when the transmission level of the data-waveform-modulated input signal has a middle value, and as this transmission level is either increased or decreased relative to this middle value the bit error quotient increases rather steeply. This particular transmission-level-dependent behavior of the system is extremely troublesome; in practice, supposedly similar transmission lines may exhibit considerable differences in their attentuation characteristics, and one cannot with certainty so preselect the transmission level of the data-waveform-modulated input signal as to assure that one will avoid a region of high bit error quotient values.

SUMMARY OF THE INVENTION

It is the general object of the invention to effect adaptive-delta-modulation transmission of a data-waveform-modulated signal in such a way as to reduce or avoid this problem of transmission-level-dependent bit error.

Somewhat more precisely, it is desired that the following be accomplished. If both a white-noise signal and a data-waveform-modulated signal are applied to the input of the delta-modulation transmission system, and if the transmission levels of these two signals are varied but with a constant difference, then it is desired that the bit error quotient stay as small as possible over a relatively wide range of variation of transmission level.

Also, it is an object that this be done in such a way that one can utilize the same adaptive-delta-modulation transmission system to alternatively transmit a simple speech signal, without producing a perceivable loss of quality of the speech signal.

These objects can be achieved by automatically varying the quantization step size of the system in dependence upon the amplitude of that spectral component of the delta-modulated output signal whose frequency is equal to the symbol stream frequency of the data-waveform-modulated input signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

To avoid confusion, the following use of terminology is explained:

The "rectangular data waveform" is the starting waveform, i.e., the "earliest" waveform discussed herein. It may, for example be a simple bit stream. The "rectangular data wveform" may, for example, have been derived from an analog waveform, but this possibility is not discussed expressly. It is simply to be understood that one begins with a "rectangular data waveform".

The "data-waveform-modulated input signal" or "data-waveform-modulated signal" v is formed by modulating the rectangular data waveform onto a carrier using the type of modem techniques discussed above: e.g., phase modulation, phase-shift keying, differential phase-shift keying, frequency modulation, or the like.

The "delta-modulated signal" d is the signal transmitted from the delta-modulation transmitter to the delta-modulation receiver. The "delta-modulated signal" is formed using adaptive delta modulation, the "data-waveform-modulated input signal" being the modulating signal for the delta modulation.

Figure 1:
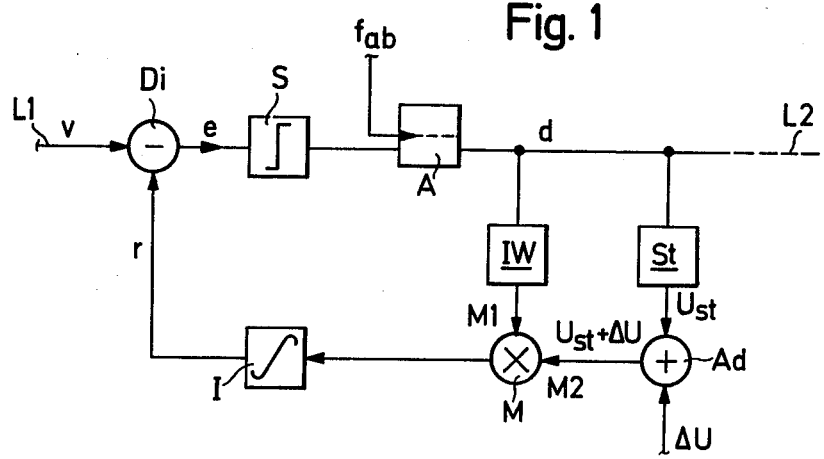
FIG. 1 is a block circuit diagram of an adaptive-delta-modulation transmitter, which receives for delta-modulated transmission a data-waveform-modulated input signal.

FIG. 1 is a block circuit depiction of a delta-modulation transmitter. The transmitter includes a difference amplifier Di. One input of differences amplifier Di recieves, via a line L1, the data-waveform-modulated input signal, which is to be used as the modulating signal for the delta modulation. The other input of difference amplifier Di receives the approximation or reconstituted signal r. The difference or error signal $e = v - r$ produced at the output of difference amplifier Di is applied to a threshold switch S. The threshold level of threshold switch S is set to reference potential, 0 volts, so that only polarity information concerning the difference signal e is furnished at the output of threshold switch S. This polarity information is sampled by a sampling circuit A, here a clocked flip-flop, with a sampling frequency $f_{ab}$.

The delta-modulated signal d to be transmitted appears at the output of sampling circuit A and is applied to a control stage St, to the input M1 of a multiplier M via a pulse converter IW, and also of course to the actual transmission line L2. The pulse converter IW converts the output waveform of sampling circuit A into a corresponding train of bipolar pulses. The control voltage $U_{st}$ produced at the output of control stage St is applied to one input of an adder Ad, the other input of which receives a voltage $\Delta U$ which is added on to the control voltage $U_{st}$. This voltage $\Delta U$ corresponds to the smallest size which is to be establishable for the quantization step, when $U_{st}=0$. The output signal $U_{st}+\Delta U$ from adder Ad is transmitted to the second input M2 of multiplier M, and serves to introduce a weighting factor into the amplitude of the constant-amplitude bipolar pulses coming from pulse converter IW. The resultant weighted-amplitude pulses produced at the output of multiplier M are transmitted to the input of an integrator I, at whose output the resconstituted or approximation signal r is produced. The approximation signal r is compared against the data-waveform-modulated input signal v, in the difference amplifier Di.

Figure 2:
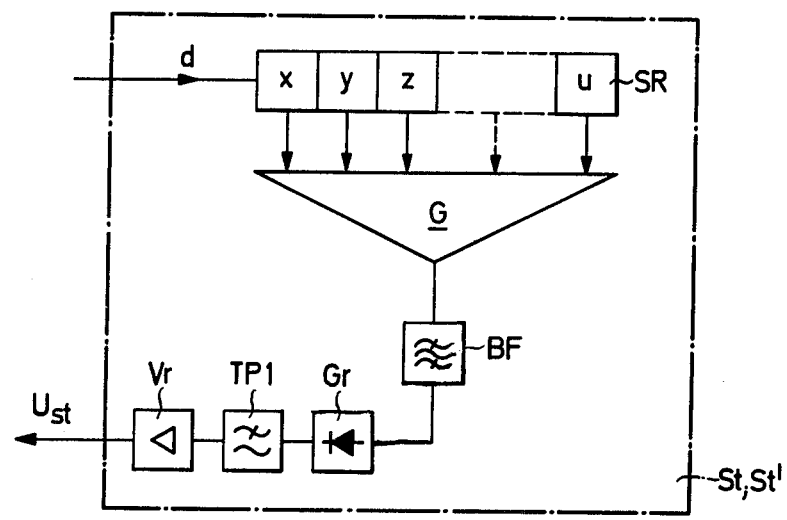
FIG. 2 depicts in greater detail the control stage St of FIG. 1.

FIG. 2 depicts an exemplary embodiment for the control stage St of FIG. 1. The control stage includes a shift register SR comprised of u shift-register stages. Preferably, u=3. The repetition frequency of the shift pulses used to shift the shift register SR equals the sampling frequency $f_{ab}$. The delta-modulated signal d is transmitted through the successive shift-register stages. The outputs of the individual shift-register stages (x, y, ... u) are connected to respective inputs of a coincidence gate G. Coincidence gate G produces an output pulse if all the signals at its u inputs have the same binary state, i.e., all "0" or all "1". The output of coincidence gate G is connected to the input of a narrowband filter BF. The output of narrowband filter BF is connected to the input of a rectifier stage Gr. The output of rectifier stage Gr is connected to the input of an RC low-pass filter TP1, the output of which is connected to the input of an amplifier Vr, at whose output the actual step-size control voltage $U_{st}$ is produced. The frequency of the narrowband filter BF is tuned to the symbol repetition frequency $f_s$ of the modem. As already mentioned by way of example, this symbol frequency $f_s$ is 1200 Hz when one is following CCITT modem recommendation V 26, and 1600 Hz when one is following CCITT modem recommendation V 27. In the preferred embodiment of the invention, the 3-dB bandwidth of the narrowband filter BF amounts to between 30 Hz and 80 Hz.

The present invention is based upon certain insights concerning the problem of level-dependent variation in the bit error quotient, discussed above. To repeat the problem, even if the signal-to-noise relationship for a combination of the data-waveform-modulated input signal v and white noise is maintained constant during its transmission to the input of the delta-modulation system, variations in absolute level can have a drastic effect upon the bit error quotient of the data waveform reconstituted at the delta-modulation receiver. An attempt to avoid this problem by keeping not only the signal-to-noise level relationship, but also the absolute level of the signal v, constant would be self-evidently troublesome. An attempt, which would not be obvious, to generate separate level-indicating information and transmit this along with the delta-modulated output signal d, so that it can be taken into account during reconstruction at the receiver, would likewise be self-evidently awkward.

It is the concept of the present invention to derive from one of the signals involved information dependent upon the transmission level of the data-waveform-modulated input signal v, this information having such a form that it can be utilized to control the quantization step size of the delta-modulation system in a way which yields a delta-modulated signal which, already at the transmitter, is level-compensated, i.e., so as to greatly reduce the level-dependence of the bit error quotient of the data waveform reconstituted at the receiver. Preferably, this level-dependent information is, as in the illustrated embodiments, constituted by information relating to the amplitude of an $f_s$ spectral component derived from the delta-modulated output signal d itself, wherein $f_s$ is the symbol (bit or word) transmission rate of the data-waveform-modulated input signal v. When a slope-overload situation begins to arise, the slope overload builds up in a periodic manner with a frequency $f_s$. With $f_s$ a given, variations in the level of the input signal v will produce corresponding variations in the rate at which the $f_s$ periodic slope-overload build-up occurs. Thus, by deriving $f_s$-spectral-component amplitude information, preferably from the delta-modulated output signal d itself, one is generating information which is highly dependent upon the transmission level of the data-waveform-modulated input signal v, and furthermore information which is of such a nature that, if used to control quantization step size, it tends to lower the level-dependence of the bit error quotient, which in turn makes is possible to lower the bit error quotient per se and keep the bit error quotient at a low value over a quite large range of transmission-level variation.

The periodic signal filtered out by the narrow-band filter BF is rectified by rectifier GR, and the resultant half-cycles are smoothed out in the RC low-pass filter TP1. This smoothened voltage is amplified by amplifier Vr, and D.C. amplifier, and the latter furnishes at its output the control signal $U_{st}$ for the control of the size of the quantization step.

Figure 3:
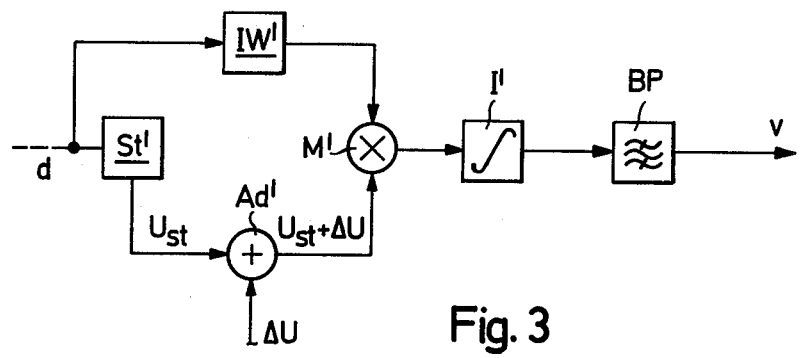
FIG. 3 depicts a delta-modulation receiver embodying the inventive method.

FIG. 3 depicts the corresponding receiver. The received delta-modulated signal d is applied to a pulse converter IW', at whose output are furnished bipolar pulses of constant amplitude corresponding to the zeros and ones of the delta-modulated signal d. Also, the signal d is applied to a control stage St', which produces at its output the step-size control voltage $U_{st}$. Control stage St' has the same circuit configuration as stage St in FIG. 2. An in FIG. 1, an adding stage Ad' adds the signal $\Delta U$ to the control voltage $U_{st}$.

The output voltage $U_{st}+\Delta U$ is applied to one input of multiplier M', and serves to weight the amplitudes of the constant-amplitude pulses arriving from pulse converter IW'. The thusly weighted impulses are applied to the integrator I', which is identical in its behavior to integrator I of FIG. 1. The output signal from integrator I' is transmitted through a bandpass filter BP, and the output signal of the latter constitutes a good approximation of the original data-waveform-modulated signal v.

Figure 4:
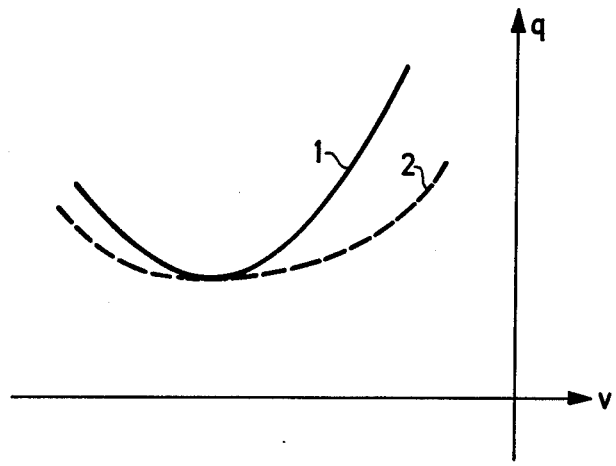
FIG. 4 depicts how, as the transmission level of the data-waveform-modulated input signal is varied, the bit error quotient of the recovered rectangular data waveform, relative to the original rectangular waveform, varies.

FIG. 4 graphically depicts the improvement achieved by the present invention. FIG. 4 a plot between, on the one hand, the bit error quotient g which arises when a rectangular data waveform is transmitted through a delta-modulation transmission system using modems, and, on the other hand, the transmission level of the data-waveform-modulated input signal v fed to the input of the delta-modulation transmission system, in the presence of a noise signal. In particular, the input of the delta-modulation transmitter receives, besides the data-waveform-modulated signal v, a well-defined noise signal, and the difference in transmission levels as between the signal v and the noise signal is maintained constant as the transmission level of signal v is varied. For plotting the two curves shown in FIG. 4, use was made of modems corresponding to CCITT recommendations V 26 or V26 bis for a transmission rate of 2400 bits per second, i.e., 2400 bits per second of the data waveform.

Curve 1 shows the typical level-dependent variation of bit error quotient q, when the quantization step size of the delta-modulation system is automatically varied in the manner conventional for the adaptive-delta-modulation transmission of speech signals. Curve 2 shows the corresponding variation when the transmitter and receiver system of FIGS. 1 and 3 is employed, i.e., with the size of the quantization step varied exclusively in dependence upon the amplitude of that spectral component derived from the delta-modulated signal d which has a frequency equal to the symbol transmission rate $f_s$, in this case dibit frequency. It should be clear that in curve 2 the bit error quotient q is lower and more constant over a wider range of transmission levels, then in curve 1.

Reference has already been made to German published patent application DT-OS No. 19 11 431, which discloses an adaptive delta modulation system specially suited for transmission of speech signals, this type of system sometimes being referred to as a speech-adaptive delta modulation system. The disclosure of this publication is incorporated herein by reference. One may wish to utilize a speech-adaptive delta modulation system for the transmission of speech signals or data-waveform-modulated signals, alternatively, i.e., sometimes the one and sometimes the other. The invention accordingly contemplates the provision of a delta-modulation transmission system set up for speech-adaptive delta-modulation transmission, as in the German published patent application referred to above, but such that it can be switched over to operate in the inventive mode when a data-waveform-modulated signal is to be delta-modulation transmitted.

According to a further concept of the invention, when one switches over from the transmission of speech signals to the transmission of data-waveform-modulated signals, the speech-adaptive mode of operation is not discontinued, and the inventive step-size control technique is utilized in a supplemental manner. This is illustrated, by way of example, in FIG. 5.

Figure 5:
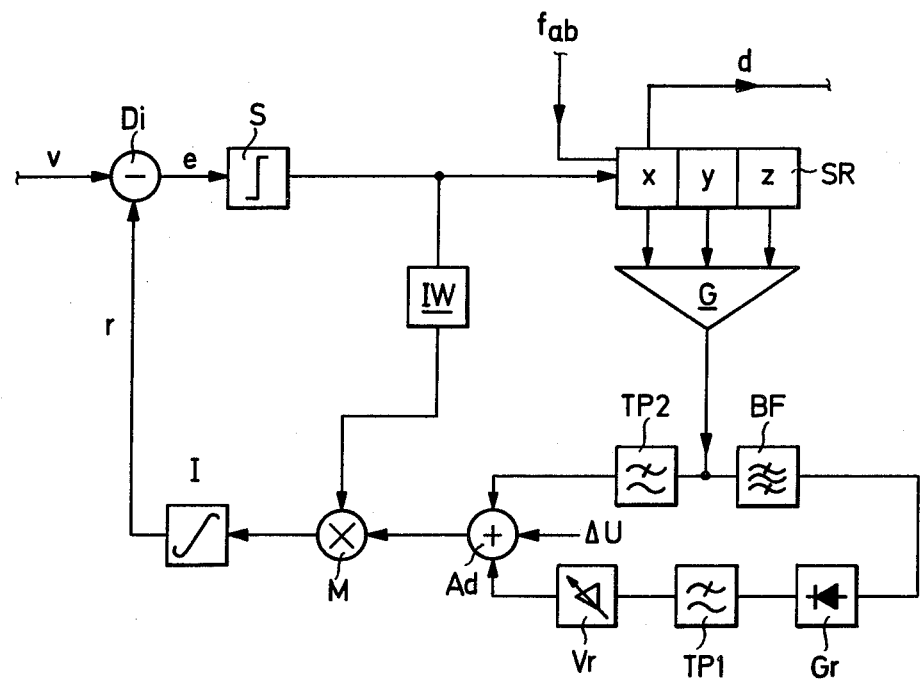
FIG. 5 depicts a delta-modulation transmitter suitable for alternative transmission of either a data-waveform-modulated input signal or a simple speech input signal.

In the system of FIG. 5 there is provided, in addition to what is depicted in FIGS. 1 and 2, a further lowpass filter TP2 connected between the output of coincidence gate G and a third input of adding stage Ad. Lowpass filter TP2 takes part in the speech-adaptive mode of operation of the delta-modulation system. The signal branch containing the inventive narrowband filter BF has virtually no effect during the transmission of speech information, i.e., has virtually no effect when the data-waveform-modulated input signal v is replaced by a simple speech signal. However, if one begins to feed in a data-waveform-modulated input signal v, this signal branch begins to exert a supportive effect upon the still present speech-adaptive action of the system, and serves to lower the bit error quotient q. This supportive action, supplemental to the speech-adaptive action, has the effect that the characteristic adaption curve of the system (the size of the quantization step as a function of the transmission level of the data-waveform-modulated input signal v) becomes linearized within the entire transmission level range of input signal v. This supplemental action is regulated in the embodiment of FIG. 5 by adjusting the threshold of the amplifier Vr. The D.C. gain of amplifier Vr is constant so long as its input signal is greater than its threshold level, but its gain is zero if its input signal is below its threshold level.

This expedient is based upon the recognition that, when using speech-adaptive action in the transmission of the data-waveform-modulated input signal v, and provided that the transmission level of the input signal v is low, the characteristic adaption curve which is achieved constitutes a good approximation to that which would be optimally required; however, when the transmission level of input signal v is higher, the speech-adaptive action does not in itself produce a control voltage $U_{st}$ of a value sufficient to establish the required size for the quantization step. In other words, the purpose of establishing a threshold level for amplifier Vr is to assure that when input signal v is of low transmission level the supplemental action in question will not set in, for the reason that the amplitude of the $f_s$ (symbol transmission rate) spectral component of the delta-modulated signal d will be too low to exceed the threshold level of amplifier Vr; however, when the input signal v is of middle or high transmission level the amplitude of the $f_s$ spectral component derived from signal d will produce a control-signal component high enough to pass through the amplifier Vr with gain. As a result, over the entire range of variation of transmission level of input signal v, there will be achieved a good approximation to the ideally desired linear characteristic adaption curve.

Figure 6:
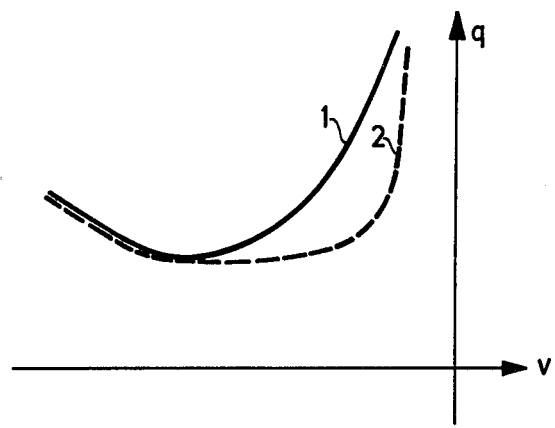
FIG. 6 is a curve such as FIG. 4, for the transmitter of FIG. 5 and a corresponding receiver.

The sense in which the bit error quotient q is thereby reduced is graphically depicted in FIG. 6. Curve 1 shows the level-dependent variation in the bit error quotient q when the data-waveform-modulated input signal v is transmitted exclusively with speech-adaptive action. Curve 2 shows this variation when the input signal v is transmitted as in FIG. 5, i.e., with speech-adaptive generation of the step-size control signal, supplemented by the inventive $f_s$-spectral-component generation of the step-size control signal. The considerable improvement of the bit error quotient q for higher transmission levels of the data-waveform-modulated input signal v is very clear.

In the foregoing explanation, it has been assumed, for the sake of simplicity, that the data waveform utilized as the modulating signal to produce the data-waveform-modulated or data-signal-modulated input signal v is rectangular. However, persons skilled in the art will understand that the data waveform need not consist of rectangular pulses, but instead could consist of pulses of other shape, for example gaussian.

It will be understood that each of the elements described above, or two or more together, may also find a useful application in other types of methods and systems differing from the types described above.

While the invention has been illustrated and described as embodied in the generation of a step-size control signal using a particular exemplary circuit technique, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for effecting adaptive-delta-modulation transmission of an input signal, comprising using for the input signal a data-signal-modulated input signal v the different values of which constitute the symbols to be transmitted and having a symbol transmission rate of $f_s$ symbols per second; applying the data-signal-modulated input signal v to the input of a controllable-step-size delta-modulation transmitter to produce a corresponding delta-modulated output signal d for transmission; continually monitoring the amplitude of an $f_s$ spectral component derived from delta-modulated output signal d said signals and generating an evaluation signal dependent upon the amplitude of that spectral component; and varying the quantization step size of the delta-modulation transmitter in dependence upon that evaluation signal.

2. The method defined in claim 1, the deriving of the $f_s$ spectral component from the delta-modulated output signal d comprising transmitting the pulses of the delta-modulated output signal d through a shift register while driving the shift register with shift pulses having a repetition frequency equal to the sampling frequency $f_{ab}$ utilized for producing the delta-modulated output signal d, and using a coincidence gate having plural inputs connected to the outputs of respective stages of the shift register to generate a signal at the output of the coincidence gate, passing the coincidence-gate output signal through a narrowband filter operative for passing an $f_s$ spectral component, passing the output signal of the narrowband filter through a rectifier, through a smoothing circuit and then through an amplifier and using the output signal of the latter as the evaluation signal.

3. The method defined in claim 2, varying the level at which evaluation-signal-dependent control of the quantization-step size sets in by varying the response threshold of the amplifier.

4. The method defined in claim 2, using a narrowband filter having 3 dB-bandwidth of between 30 and 80 Hz.

5. In an adaptive-delta-modulation transmission system, in combination, means furnishing a data-signal-modulated input signal v the different values of which constitute the symbols to be transmitted and having a symbol transmission rate of $f_s$ symbols per second; controllable-step-size delta-modulating means operative for receiving the input signal v and utilizing the latter as a modulating signal producing a delta-modulated output signal d; means operative for deriving from said delta-modulated output signal d an $f_s$ spectral component and generating an evaluation signal dependent upon the amplitude of that spectral component; and means operative in dependence upon said evaluation signal for varying the quantization step size of the delta-modulating means.

6. A method for effecting adaptive-delta-modulation transmission of an input signal, comprising alternately using as the input signal applied to the input of a controllable-step-size delta-modulation transmitter a speech signal and a data-signal-modulated input signal v the different values of which constitute symbols to be transmitted and having a symbol transmission rate of $f_s$ symbols per second; and when using the data-signal-modulated input signal v as the input signal applying the signal v to the input of the delta-modulation transmitter to produce a corresponding delta-modulated output signal d for transmission, continually monitoring the amplitude of an $f_s$ spectral component derived from said delta-modulated output signal d and generating an evaluation signal dependent upon the amplitude of that spectral component, and varying the quantization step size of the delta-modulation transmitter exclusively in dependence upon that evaluation signal.

7. A method of effecting adaptive-delta-modulation transmission of an input signal, comprising alternatively using as the input signal applied to the input of a controllable-step-size delta-modulation transmitter a speech signal and a data-signal-modulated input signal v the different values of which constitute symbols to be transmitted and having a symbol transmission rate of $f_s$ symbols per second; when using a speech signal as the input signal, varying the quantization step size by speech-adaptive action; and when using the data-signal-modulated input signal v as the input signal applying the signal v to the input of the delta-modulation transmitter to produce a corresponding delta-modulated output signal d for transmission, continually monitoring the amplitude of an $f_s$ spectral component derived from said delta-modulated output signal d and generating an evaluation signal dependent upon the amplitude of that spectral component, and varying the quantization step size by speech-adaptive action but additionally in dependence upon said evaluation signal.

8. A method as defined in claim 7, effecting change-overs between the step-size control action used for the speech signal and the step-size control action used for the data-signal-modulated input signal v in dependence upon the appearance and disappearance of said evaluation signal.

9. A method of effecting adaptive-delta-modulation transmission of an input signal, comprising alternately using as the input signal applied to the input of a controllable-step-size delta-modulation transmitter a speech signal and a data-signal-modulated input signal v the different values of which constitute symbols to be transmitted and having a symbol transmission rate of $f_s$ symbols per second; when using a speech signal as the input signal, varying the quantization step size by speech-adaptive action; and when using the data-signal-modulated input signal v as the input signal applying the signal v to the input of the delta-modulation transmitter to produce a corresponding delta-modulated output signal d for transmission, continually monitoring the amplitude of an $f_s$ spectral component derived from said delta-modulated output signal d and generating an evaluation signal dependent upon the amplitude of that spectral component, varying the quantization step size for the input signal v by speech-adaptive action so long as the evaluation signal is below a predetermined value, but varying the quantization step size for the input signal v by speech-adaptive action and in addition thereto in dependence upon the evaluation signal so long as the evaluation signal is above a predetermined value.

* * * * *